United States Patent
Norieda

(10) Patent No.: US 9,323,371 B2
(45) Date of Patent: Apr. 26, 2016

(54) HAPTIC SENSATION PRODUCING DEVICE, INFORMATION TERMINAL, HAPTIC SENSATION PRODUCING METHOD, AND COMPUTER-READABLE RECORDING MEDIUM

(71) Applicant: Shin Norieda, Tokyo (JP)

(72) Inventor: Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 14/360,515

(22) PCT Filed: Nov. 12, 2012

(86) PCT No.: PCT/JP2012/079260
§ 371 (c)(1),
(2) Date: May 23, 2014

(87) PCT Pub. No.: WO2013/084666
PCT Pub. Date: Jun. 13, 2013

(65) Prior Publication Data
US 2014/0327642 A1   Nov. 6, 2014

(30) Foreign Application Priority Data
Dec. 5, 2011 (JP) ................................ 2011-266323

(51) Int. Cl.
*G06F 3/01* (2006.01)
*G06F 3/041* (2006.01)

(52) U.S. Cl.
CPC . *G06F 3/041* (2013.01); *G06F 3/01* (2013.01)

(58) Field of Classification Search
CPC ..... G06F 3/041; G06F 3/0416; G06F 3/0412; G06F 3/0488; G06F 3/04883; G06F 3/044; G06F 3/0418; G06F 3/04886
See application file for complete search history.

(56) References Cited

U.S. PATENT DOCUMENTS

| | | | |
|---|---|---|---|
| 5,631,861 A * | 5/1997 | Kramer | 703/7 |
| 6,184,868 B1 | 2/2001 | Shahoian et al. | |
| 2002/0021277 A1* | 2/2002 | Kramer et al. | 345/156 |
| 2005/0103413 A1* | 5/2005 | Tozawa et al. | 152/152.1 |
| 2007/0035526 A1 | 2/2007 | Takenaka et al. | |

FOREIGN PATENT DOCUMENTS

| | | |
|---|---|---|
| JP | 2003-58321 A | 2/2003 |
| JP | 2003-172662 A | 6/2003 |

(Continued)

OTHER PUBLICATIONS

International Search Report of PCT/JP2012/079260, dated Jan. 29, 2013.

*Primary Examiner* — Olga Merkoulova
(74) *Attorney, Agent, or Firm* — Sughrue Mion, PLLC

(57) ABSTRACT

A haptic sensation producing device (10) for presenting a haptic sensation to a user is equipped with a panel-like haptic sensation producing member (11) that is disposed on the front face side of a display panel (20), wires (12) for holding the haptic sensation producing member (11), wire tensile units (13) that are provided for the respective wires and pull the corresponding wires, and a control unit (14) that controls the wire tensile units (13) to move the haptic sensation producing member (11) and generate the haptic sensation. If a change occurs in an object in a content as a result of a touch by the user, the control unit (14) calculates tensile forces such that the haptic sensation conforming to the change can be generated and the tensile forces are optimized, and controls the wire tensile units (13) based on the calculated tensile forces.

18 Claims, 9 Drawing Sheets

(56) References Cited

FOREIGN PATENT DOCUMENTS

| | | |
|---|---|---|
| JP | 2004-530200 A | 9/2004 |
| JP | 2005-165851 A | 6/2005 |
| JP | 2006-24041 A | 1/2006 |
| JP | 2007-34938 A | 2/2007 |
| JP | 4039344 B2 | 1/2008 |
| JP | 2008-287402 A | 11/2008 |
| JP | 4229098 B2 | 2/2009 |
| JP | 2010-33560 A | 2/2010 |

* cited by examiner

HAPTIC SENSATION PRODUCING DEVICE, INFORMATION TERMINAL, HAPTIC SENSATION PRODUCING METHOD, AND COMPUTER-READABLE RECORDING MEDIUM

CROSS REFERENCE TO RELATED APPLICATIONS

This application is a National Stage of International Application No. PCT/JP2012/079260 filed Nov. 12, 2012, claiming priority based on Japanese Patent Application No. 2011-266323, filed Dec. 5, 2011, the contents of all of which are incorporated herein by reference in their entirety.

TECHNICAL FIELD

The present invention relates to a haptic sensation producing device for presenting (transmitting) a haptic sensation to a user, an information terminal, such as a POS terminal or a mobile terminal, that is equipped with the haptic sensation producing device, a haptic sensation producing method, and a computer-readable recording medium storing a program for realizing the haptic sensation producing device, the information terminal, and the haptic sensation presenting method.

BACKGROUND ART

In recent years, more and more information terminals have employed a touch panel as an input device. Since a touch panel can be disposed so as to be superimposed on a display panel, it is mainstream to use it particularly in mobile information terminals, for the reason that a larger screen can be used.

However, a touch panel can provide feedback with respect to a user operation only by presenting some kind of information on the screen. For this reason, the touch panel has a problem in that it is difficult for the user to recognize the portion of the screen that is being touched.

Furthermore, with an information terminal, the amount of information that can be transmitted to a user can be drastically increased if the details of content or the like displayed on the screen can be transmitted by providing a sense of touch to a fingertip or the like of the user. However, a touch panel cannot transmit the sense of touch.

To address this problem, a device has been proposed that enables physical feedback to be provided to a fingertip of a user, that is, enables a haptic sensation to be presented (transmitted) (e.g., see Patent Documents 1 and 2). For example, the device disclosed in Patent Document 1 is equipped with a mechanism that enables a display panel provided with a touch panel on its screen to be moved along the thickness direction thereof. With the device disclosed in Patent Document 1, the aforementioned mechanism can move the display panel in accordance with a finger touch by a user, and accordingly, a haptic sensation can be presented to the user.

The device disclosed in Patent Document 2 includes a mechanism for vibrating a touch panel in a direction parallel to the input surface thereof, using a flexure displacement type of piezoelectric actuator. With the device disclosed in Patent Document 2, the aforementioned mechanism can provide vibration to a fingertip of a user when he/she performs a predetermined operation, and accordingly, a haptic sensation can be presented to the user.

CITATION LIST

Patent Document

Patent Document 1: Japanese Patent No. 4039344
Patent Document 2: Japanese Patent No. 4229098

DISCLOSURE OF THE INVENTION

Problem to be Solved by the Invention

Incidentally, although a haptic sensation can be presented to a user with the devices disclosed in Patent Documents 1 and 2 mentioned above, these devices have the following problems.

Firstly, with the device disclosed in Patent Document 1, the entire touch panel needs to be moved in its thickness direction, and therefore, the device configuration is complicated, and it is difficult to reduce the size and weight of the device.

Secondly, with the device disclosed in Patent Document 2, a haptic sensation is presented by means of vibration of the touch panel, and therefore, the range in which the member (i.e., the touch panel in this case) for transmitting the haptic sensation can be displaced is small, and it is difficult to make the haptic sensation more expressive. Consequently, the device disclosed in Patent Document 2 is not suitable for contents in which the haptic sensation needs to be successively changed, or contents that require accuracy of the haptic sensation.

An exemplary object of the present invention is to solve the above-described problems and provide a haptic sensation producing device, an information terminal, a haptic sensation producing method, and a computer-readable recording medium with which the size and weight of the device can be reduced and a highly expressive haptic sensation can be presented.

Means for Solving the Problem

To achieve the above-stated object, a haptic sensation producing device according to one aspect of the present invention is a haptic sensation producing device for presenting a haptic sensation to a user in accordance with a content displayed on a display panel, comprising:
a panel-like haptic sensation producing member;
a plurality of wires for holding the haptic sensation producing member;
wire tensile units that are provided for the respective wires and pull the corresponding wires; and
a control unit that controls the wire tensile units and moves the haptic sensation producing member along a front face of the display panel to generate the haptic sensation,
wherein if a change occurs in an object included in the content as a result of the user touching the haptic sensation producing member, the control unit calculates tensile forces for the respective wire tensile units such that the haptic sensation conforming to the change of the object can be generated and such that the tensile forces are optimized, and controls the wire tensile units based on the calculated tensile forces.

To achieve the above-stated object, an information terminal according to one aspect of the present invention is equipped with a display panel that displays a content, a touch sensor that detects a position that is touched by a user, an information processing unit that changes an object included in the content in accordance with the position detected by the touch sensor, and a haptic sensation producing device capable of presenting a haptic sensation to the user in accordance with the content, the haptic sensation producing device comprising:
a panel-like haptic sensation producing member;
a plurality of wires for holding the haptic sensation producing member;
wire tensile units that are provided for the respective wires and pull the corresponding wires; and
a control unit that controls the wire tensile units and moves the haptic sensation producing member along a front face of the display panel to generate the haptic sensation,
wherein if the user touches the haptic sensation producing member and the information processing unit changes the object included in the content in accordance with the position detected by the touch sensor, the control unit calculates tensile forces for the respective wire tensile units such that the haptic sensation conforming to the change of the object can be generated and such that the tensile forces are optimized, and controls the wire tensile units based on the calculated tensile forces.

To achieve the above-stated object, a haptic sensation producing method according to one aspect of the present invention is a method for presenting a haptic sensation to a user in accordance with a content displayed on a display panel, comprising:
a step (X) in which, in a device equipped with a panel-like haptic sensation producing member, a plurality of wires for holding the haptic sensation producing member, and wire tensile units that are provided for the respective wires and pull the corresponding wires, if a change occurs in an object included in the content as a result of the user touching the haptic sensation producing member, tensile forces for the respective wire tensile units are calculated such that the haptic sensation conforming to the change of the object can be generated by moving the haptic sensation producing member along a front face of the display panel, and such that the tensile forces for the wire tensile units are optimized; and
a step (Y) of controlling the wire tensile units based on the calculated tensile forces.

Furthermore, to achieve the above-stated object, a computer-readable recording medium according to one aspect of the present invention is for a device that is equipped with a panel-like haptic sensation producing member, a plurality of wires for holding the haptic sensation producing member, wire tensile units that are provided for the respective wires and pull the corresponding wires, and a computer, and that presents a haptic sensation to a user in accordance with a content displayed on a display panel, the computer-readable recording medium storing a program containing a command for causing the computer to execute:
a step (X) in which if a change occurs in an object included in the content as a result of the user touching the haptic sensation producing member, tensile forces for the respective wire tensile units are calculated such that the haptic sensation conforming to the change of the object can be generated by moving the haptic sensation producing member along a front face of the display panel, and such that the tensile forces for the wire tensile units are optimized; and
a step (Y) of controlling the wire tensile units based on the calculated tensile forces.

Effects of the Invention

As described above, according to the present invention, a reduction in the size and weight of the device can be achieved, and a highly expressive haptic sensation can be presented.

BRIEF DESCRIPTION OF THE DRAWINGS

FIG. 3(a) is a plan view, and FIG. 3(b) is a side view.

DESCRIPTION OF EMBODIMENTS

Embodiment 1

Hereinafter, a haptic sensation producing device, an information terminal, a haptic sensation producing method, and a program according to Embodiment 1 of the present invention will be described with reference to FIGS. 1 to 3.

Device Configuration

Firstly, a configuration of a haptic sensation producing device and an information terminal according to Embodiment 1 will be described with reference to FIGS. 1 and 2. FIG. 1 is a perspective view showing an external appearance of the information terminal according to Embodiment 1 of the present invention. FIG. 2 is an exploded perspective view showing constituent components of the information terminal according to Embodiment 1 of the present invention.

Figure 1:
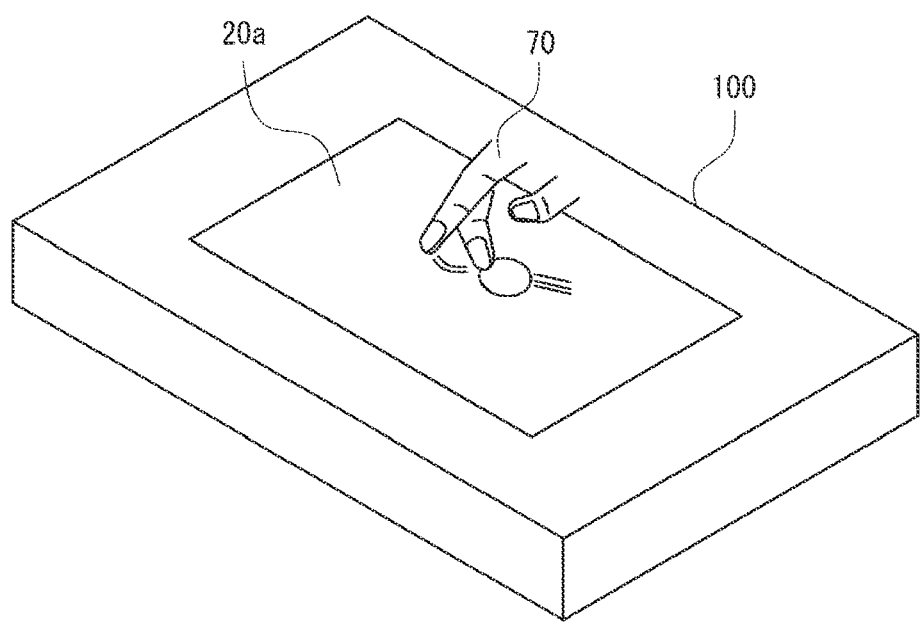
FIG. 1 is a perspective view showing an external appearance of an information terminal according to Embodiment 1 of the present invention.

As shown in FIG. 1, an information terminal 100 according to Embodiment 1 is a tablet-type information terminal. As shown in FIG. 2, the information terminal 100 is equipped with a display panel 20 for displaying a content, a touch sensor 30 for detecting a position (hereinafter referred to as a "touch position") that is touched by a user, and an information processing unit 40 for changing an object included in the content in accordance with the detected touch position.

With this configuration, as shown in FIG. 1, upon a user 70 performing an operational input on the information terminal 100 by touching it, in the information terminal 100, the touch position is detected by the touch sensor 30, and the information processing unit 40 is notified of the detected position. Then, the information processing unit 40 executes various kinds of information processing in accordance with the operational input by the user, and displays various contents on a display screen 20a of the display panel 20.

Figure 2:
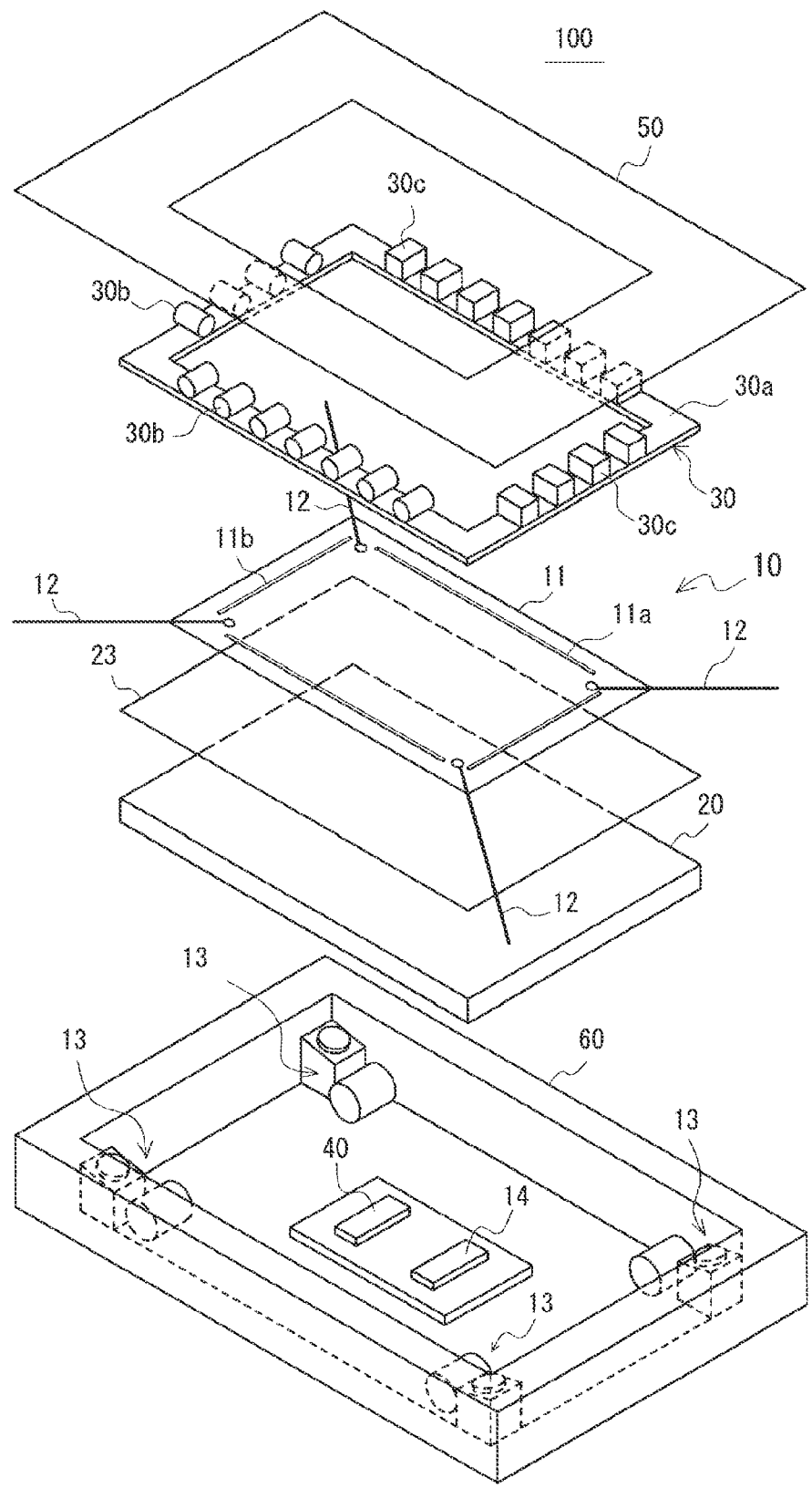
FIG. 2 is an exploded perspective view showing constituent components of the information terminal according to Embodiment 1 of the present invention.

As shown in FIGS. 2 and 3, the information terminal 100 is equipped with a haptic sensation producing device 10 that presents a haptic sensation to a user 70 (see FIG. 1). The haptic sensation producing device 10 includes a haptic sensation producing member 11 for presenting a haptic sensation to the user 70, a plurality of wires 12, wire tensile units 13, and a control unit 14.

The haptic sensation producing member 11 is disposed on the front face side of the display panel 20 for displaying a content, and has a panel shape. The wires 12 hold the haptic sensation producing member 11. The wire tensile units 13 are provided for the respective wires 12, and pull the corresponding wires.

The control unit 14 controls the wire tensile units 13 so as to move the haptic sensation producing member 11 along the front face of the display panel 20 and thereby generates a haptic sensation. Specifically, if a change occurs in an object included in the content as a result of the user 70 touching the haptic sensation producing member 11, the control unit 14 calculates tensile forces for the respective wire tensile units and controls the wire tensile units 13 based on the calculated tensile forces. At this time, the control unit 14 calculates the tensile forces such that a haptic sensation conforming to the change of the object can be generated and the tensile forces for the respective wire tensile units are optimized.

Thus, the haptic sensation producing device 10 horizontally moves the haptic sensation producing member 11 disposed on the front face side of the display panel 20 in conjunction with the touch position of the finger of the user 70 and the movement in the content shown on the display panel 20. Accordingly, the user 70 can feel a touch as if actually touching a virtual body (an object in a virtual space).

In the example in FIG. 1, the finger of the user 70 is in contact with a virtual ball displayed on the display panel 20. Thus, the user 70 can feel, at his/her fingertip, a repellent force and a touch given from the virtual ball by means of the haptic sensation producing member 11 in accordance with the positional relationship between the virtual ball and the finger and a behavior (speed, weight) of the virtual ball. Note that the "haptic sensation" in the present invention means a repellent force, a resistance force, an external force, a touch, and the like that the user feels.

With the haptic sensation producing device 10, a haptic sensation can be presented with a simple configuration, and accordingly, a reduction in the size and weight of the entire device can be promoted. The moving direction of the haptic sensation producing member 11 is highly flexible, which can make the haptic sensation more expressive.

Figure 3A:
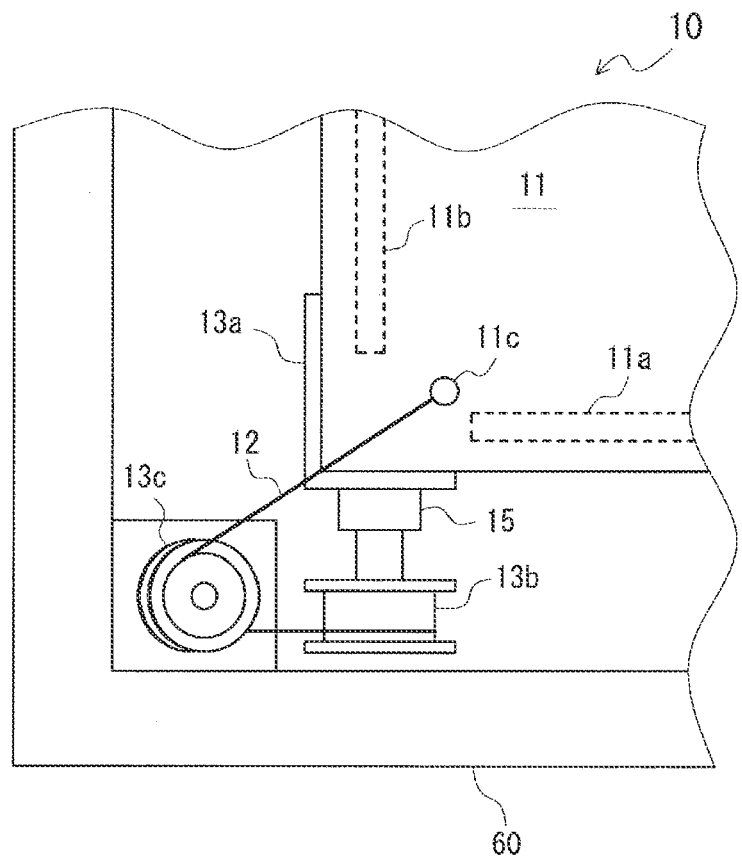
FIGS. 3(a) and 3(b) are diagrams showing a detailed configuration of a wire tensile unit of the information terminal shown in FIGS. 1 and 2.
Figure 3B:
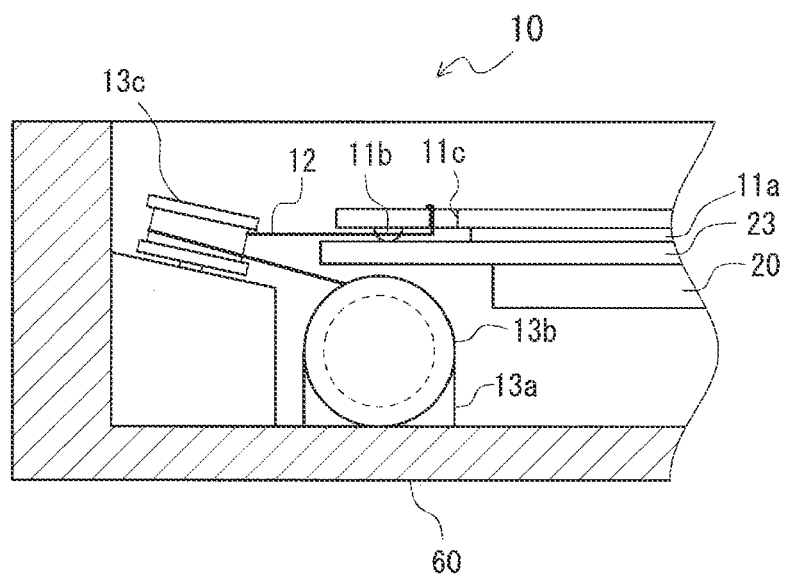

Now, the configuration of the information terminal 100 and the haptic sensation producing device 10 according to Embodiment 1 will be described in more detail with reference to FIG. 3 in addition to FIGS. 1 and 2. FIGS. 3(a) and 3(b) are diagrams showing a detailed configuration of the wire tensile unit of the information terminal shown in FIGS. 1 and 2. FIG. 3(a) is a plan view, and FIG. 3(b) is a side view.

As shown in FIG. 2, the information terminal 100 is constituted by mainly four layers. The following description is given assuming that the layer that is closest to the user is the first layer. Firstly, the first layer includes a cover 50 and the touch sensor 30. The cover 50 is attached to a casing 60 that constitutes the fourth layer, which will be described later. The cover 50 holds the touch sensor 30, and also plays the role of hiding the internal configuration of the information terminal 100 including the touch sensor 30 from the user.

The touch sensor 30 according to Embodiment 1 is an optical touch sensor including a plurality of light-emitting devices and corresponding light-receiving devices. Specifically, the touch sensor 30 includes a frame 30a, a plurality of light-emitting devices 30b that are disposed parallel to one of two opposing sides, and a plurality of light-receiving devices 30c that are disposed parallel to the other side.

Furthermore, some of the light-emitting devices 30b are disposed so as to be able to emit light in the vertical direction of the screen, and the remaining light-emitting devices 30b are disposed so as to be able to emit light in the horizontal direction of the screen. For this reason, upon a portion of emitted light being interrupted by the finger of the user 70 that moves on the surface of haptic sensation producing member 11, the portion where the light is interrupted is detected as the touch position. Then, the touch sensor 30 outputs data (hereinafter referred to as "touch detection data a") for specifying the detected touch position to the information processing unit 40 (see FIG. 4).

In Embodiment 1, the touch sensor 30 is not limited to an optical touch sensor, and may be a capacitance or pressure-sensitive touch panel sensor. Note that in the case of using a touch panel sensor as the touch sensor 30, the touch sensor 30 is disposed between the display panel 2 and the haptic sensation producing member 11 in the second layer, which will be described later.

The second layer includes the haptic sensation producing member 11 and the wires 12. In Embodiment 1, the haptic sensation producing member 11 is a rectangular plate that is made of transparent resin, such as acrylic resin. As shown in FIGS. 3(a) and 3(b), the haptic sensation producing member 11 has, on its surface on the third layer side, projecting portions 11a and 11b that have a semicircular cross-section and extend along the respective sides. The function of the projecting portion 11a and the projecting portion 11b will be described later.

In Embodiment 1, four wires 12 are used, and the wires 12 are attached to the haptic sensation producing member 11 near the corners thereof, via through holes 11c provided at these corners. With this configuration, the haptic sensation producing member 11 can present a haptic sensation as a result of being pulled in four directions by the four wires 12 so as to be moved in any horizontal plane direction due to the balance between the tensile forces.

The above-described cover 50 is also formed so as to hide the wires 12 from the user 70, and accordingly, a state where an image displayed on the display panel 20 is hidden by the wires 12 cannot be seen. Furthermore, a situation where the user touches the wires 12 and thus causes a failure of the device can be avoided.

The third layer includes a support panel 23 and the display panel 20. In Embodiment 1, a liquid crystal display panel is used as the display panel 20. However, the display panel 20 is not limited thereto, and the display method is not particularly limited as long as the display panel 20 is a thin display panel.

The support panel 23 is a rectangular plate that is made of transparent resin such as acrylic resin and covers the display panel 20. The support panel 23 is disposed between the haptic sensation producing member 11 and the display panel 20, and supports the haptic sensation producing member 11 and protects the display panel 20.

As shown in FIGS. 3(a) and 3(b), a space is provided by the projecting portions 11a and 11b between the support panel 23 and the haptic sensation producing member 11, and the wires 12 are led to the wire tensile units 13 via this space. Furthermore, since the cross-section of the projecting portions 11a and 11b is semicircular, and the projecting portions 11a and 11b come into linear contact with the support panel 23, as described above, the surface of the support panel is prevented from being damaged due to the movement of the haptic sensation producing member 11.

The fourth layer includes the wire tensile units 13, the control unit 14, the information processing unit 40, and the casing 60 for housing these components. Among them, the control unit 14 and the information processing unit 40 are realized by a computer such as a microcomputer. The control unit 14 and the information processing unit 40 may be realized by separate computers, or may be realized by a single computer.

As shown in FIGS. 3(a) and 3(b), in Embodiment 1, each wire tensile unit 13 includes a motor 13a that functions as an actuator, a pulley 13b for reeling in the wire 12, and a tensile force direction conversion pulley 13c. With this configuration, rotational force exerted by the motor 13a is transmitted as tensile force to the haptic sensation producing member 11 via the wire 12, and consequently the haptic sensation producing member 11 is pulled, and a haptic sensation is presented to the user 70.

Specifically, first, the rotational force of the motor 13a is converted into linear tensile force along a side face of the casing 60 by the pulley 13b for reeling in the wire 12. Next, the direction of the tensile force is converted from linear direction along the side face of the casing into a direction that extends from the through hole 11c of the haptic sensation producing member 11 toward a corner of the casing 60, by the corresponding one of the tensile force direction conversion pulleys 13c disposed at the four corners of the casing 60. Accordingly, upon the motor 13a being activated, the haptic sensation producing member 11 is pulled toward the tensile force direction conversion pulley 13c due to the generated tensile force.

In Embodiment 1, the haptic sensation producing member 11 can be thus moved by a transmission mechanism using the wires 12. Since this transmission mechanism can be constituted by lightweight components and moreover with a simple configuration, a reduction in the size and weight of the entire device can be promoted, as described above. Furthermore, since the wires 12 are used, the number of constraints regarding the placement of the motors 13a serving as a power source is small, which enhances the flexibility in designing.

In each wire tensile unit 13, the direction of the tensile force extending from the haptic sensation producing member 11 toward the tensile force direction conversion pulley 13c is not fixed to one direction, and is variable. Furthermore, the length of each wire 12 is also variable. Accordingly, as described above, the moving direction of the haptic sensation producing member 11 is more flexible, and the haptic sensation will be more expressive. Note that in the present specification, the "length of each wire 12" means the length from the through hole 11c to the position where the wire 12 comes into contact with the pulley 13b for reeling in the wire 12.

In Embodiment 1, as shown in FIGS. 3(a) and 3(b), each motor 13a is provided with a sensor 15 for detecting the number of rotations of the motor 13a. The sensor 15 outputs data for specifying the detected number of rotations to the control unit 14 (see FIG. 2). Note that specific examples of the sensor 15 include an optical rotary encoder.

Incidentally, if the number of rotations of the motor 13a is found, the length of the wire 12 is also found since the circumferential length of the pulley 13b is known. Assuming that the wires 12 are not loose, if the respective lengths of the wires 12 are found, the position of the haptic sensation producing member 11 can be specified therefrom. For this reason, as will be described later, the control unit 14 specifies the position of the haptic sensation producing member 11 based on data (hereinafter referred to as "position detection data c") that is output by the sensor 15.

Figure 4:
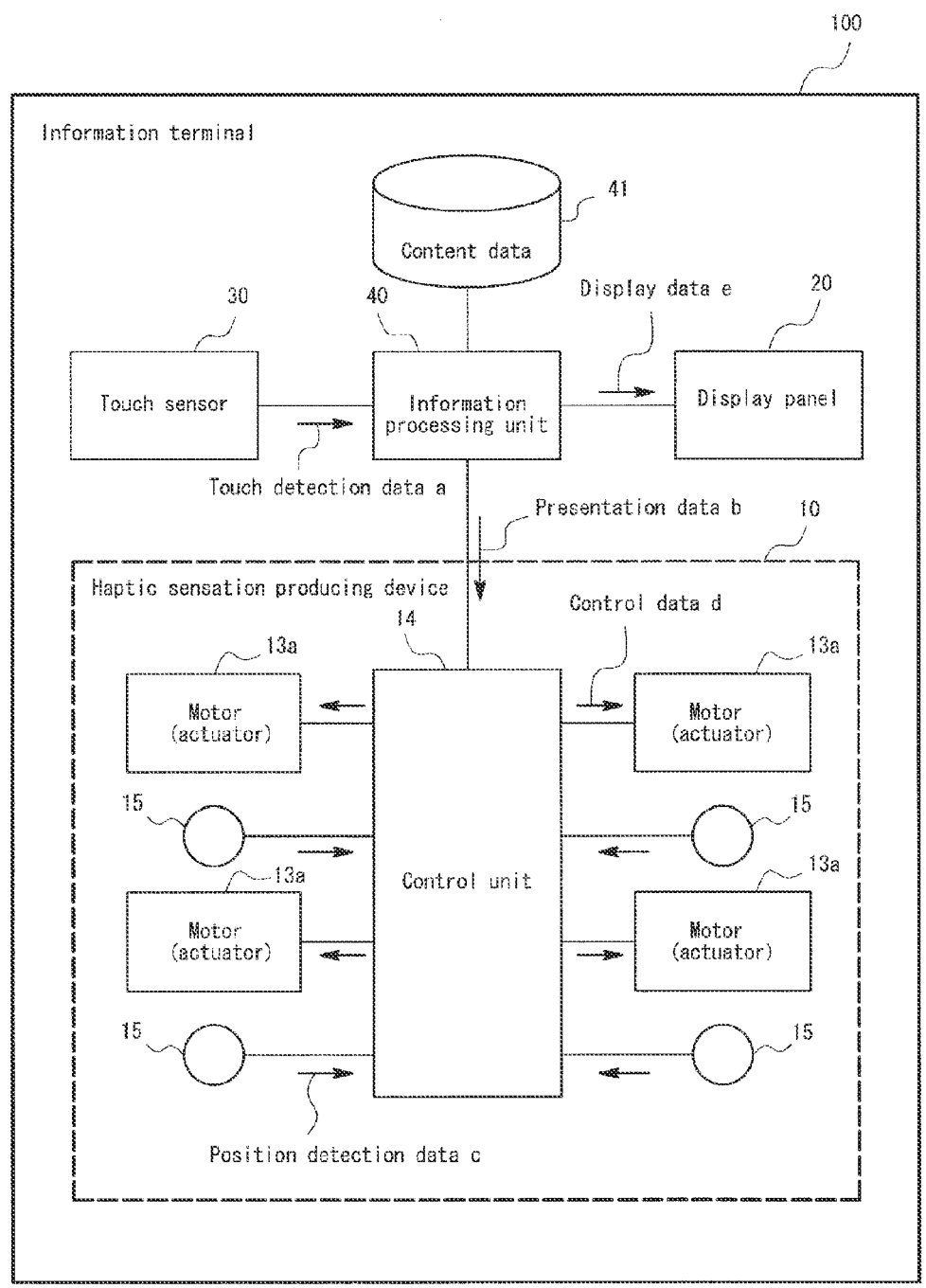
FIG. 4 is a block diagram showing a configuration of the information terminal according to Embodiment 1 of the present invention.

Subsequently, the data exchanged with the information terminal 100 will be described using FIG. 4. FIG. 4 is a block diagram showing a configuration of the information terminal according to Embodiment 1 of the present invention.

As shown in FIG. 4, the information processing unit 40 is connected to the display panel 20, the touch sensor 30, and the control unit 14. The control unit 14 is connected to the motors 13a and the sensors 15 that constitute the wire tensile units 13, as well as to the information processing unit 40.

With this configuration, upon the user 70 (see FIG. 1) touching the haptic sensation producing member 11 disposed on the front face side of the display, the touch sensor 30 detects the touch position of the finger of the user, and outputs the touch detection data a for specifying the touch position to the information processing unit 40.

Upon receiving the touch detection data a, the information processing unit 40 references content data 41, performs processing for associating the touch position with the movement of an object in the content, and outputs content display information that reflects the result of this processing, as display data e, to the display panel 20.

Specific examples of the content data 41 include data of application programs for providing a virtual space, such as a game program and a simulation program, and website data. The content data 41 may be stored in a storage device provided in the information terminal 100, or may be stored in a separate device (computer) connected via the Internet.

At this time, the information processing unit 40 calculates a force generated on the object in the virtual space, and outputs data b (hereinafter referred to as "presentation data b") for specifying the calculated force to the control unit 14. The calculated force is a repellent force or the like that is generated on the object, and corresponds to the haptic sensation to be transmitted to the user.

Upon receiving the presentation data b, the control unit 14, calculates the tensile forces to be output by the respective wire tensile units 13 using the position detection data c that is output from the sensors 15, such that the haptic sensation specified by the presentation data b is transmitted to the user 70.

Then, the control unit 14 generates control data d for causing the motors 13a to exert the tensile forces, and outputs the generated control data d to the motors 13a. Specifically, the control unit 14 generates a pulse signal for driving the motors 13a, using a power circuit (not shown), and outputs this pulse signal as the control data d. Thus, the motors 13a pull the haptic sensation producing member 11 with the calculated tensile forces, and the haptic sensation specified by the presentation data b is presented to the fingertip of the user 70.

Operation

Figure 5:
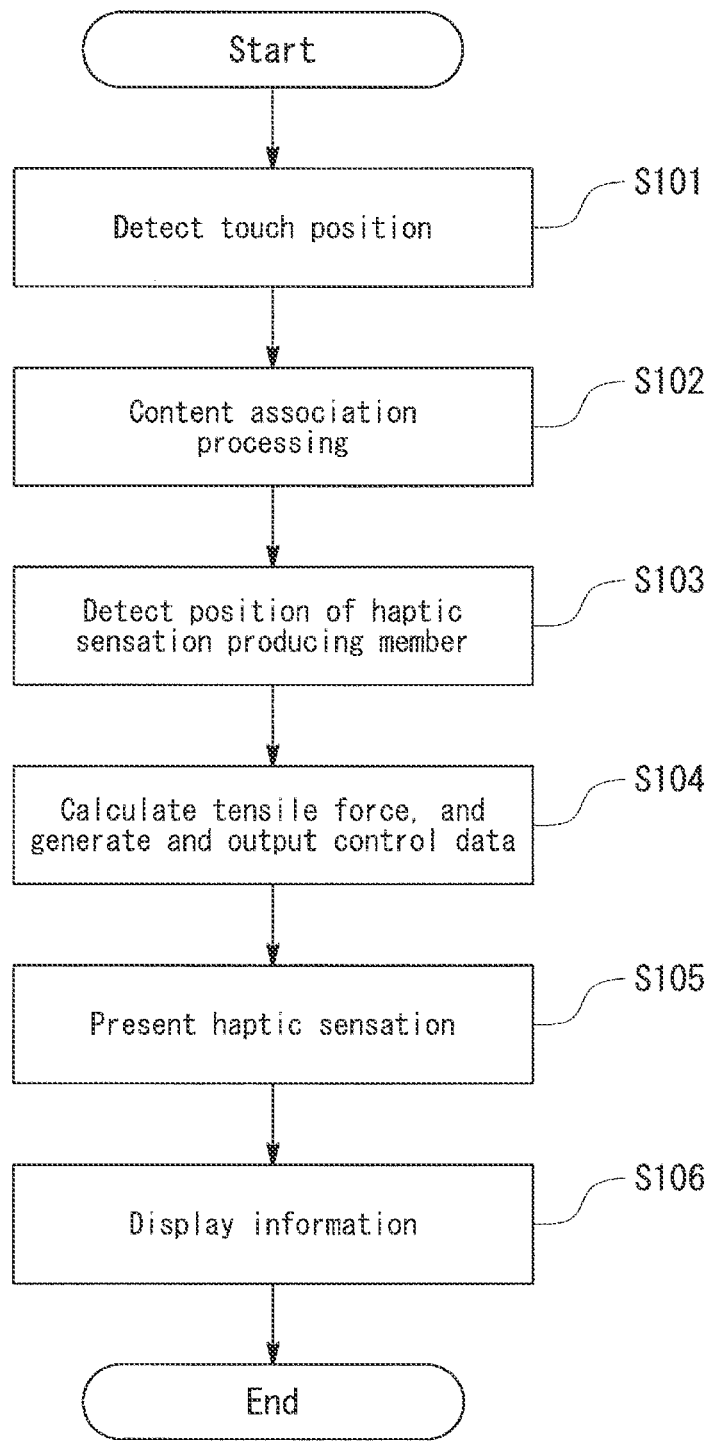
FIG. 5 is a flowchart showing an operation of an information terminal 100 according to Embodiment 1 of the present invention.

Next, the operation of the information terminal 100 and the haptic sensation producing device 10 in Embodiment 1 of the present invention will be described using FIG. 5. FIG. 5 is a flowchart showing the operation of the information terminal 100 according to Embodiment 1 of the present invention. Note that in the following description, FIGS. 1 and 4 will be referenced as appropriate. In Embodiment 1, a haptic sensation producing method is carried out by operating the haptic sensation producing device 10. Accordingly, the following description of the operation of the haptic sensation producing device 10 replaces a description of the haptic sensation producing method according to Embodiment 1.

Initially, the user 70 visually recognizes a content displayed on the display panel 20 through the haptic sensation producing member 11, and touches the haptic sensation producing member 11 (see FIGS. 1 and 2) in order to operate an object in the virtual space provided by the content. Thus, as shown in FIG. 5, the touch sensor 30 detects the touch position of the user 70, and outputs the touch detection data a for specifying the detected touch position to the information processing unit 40 (step S101).

Next, upon receiving the touch detection data a that was output in step S101, the information processing unit 40 references the content data 41, and executes processing (content association processing) for changing the object in accordance with the touched position (step S102).

Further, in step S102, the information processing unit 40 outputs content display information that reflects the details of the content association processing as the display data e to the display panel 20. Furthermore, in step S102, the information processing unit 40 calculates a force generated on the object in the virtual space, and outputs the presentation data b for specifying the calculated force to the control unit 14.

Next, in the haptic sensation producing device 10, the control unit 14 acquires the position detection data c that is output by the sensors 15 provided in the motors 13a, and detects the position of the haptic sensation producing member 11 using the acquired position detection data c (step S103).

Next, upon receiving the presentation data b that is output in step S102, the control unit 14 calculates the tensile forces to be output by the respective wire tensile units 13, based on the received presentation data b and the position of the haptic sensation producing member 11 that was detected in step S103 (step S104). Furthermore, in step S104, the control unit 14 generates the control data d such that the motors 13a generate the calculated tensile forces, and outputs the generated control data d to the motors 13a.

After step S104 is executed, the haptic sensation producing device 10 presents a haptic sensation to the fingertip of the user 70 (step S105). Further, a content resulting from the content association processing is displayed based on the display data e that is output by the information processing unit 40 in step S102, on the display screen 20a of the display panel 20 (step S106). Note that step S105 and step S106 may be executed simultaneously.

In Embodiment 1, steps S101 to S106 are repeatedly executed. Accordingly, if the user 70 performs a drag operation from one point to another point, steps S101 to S106 are repeatedly executed from the start of dragging until the end thereof, and during this, the user 70 can continuously receive presentation of the haptic sensation.

Figure 6:
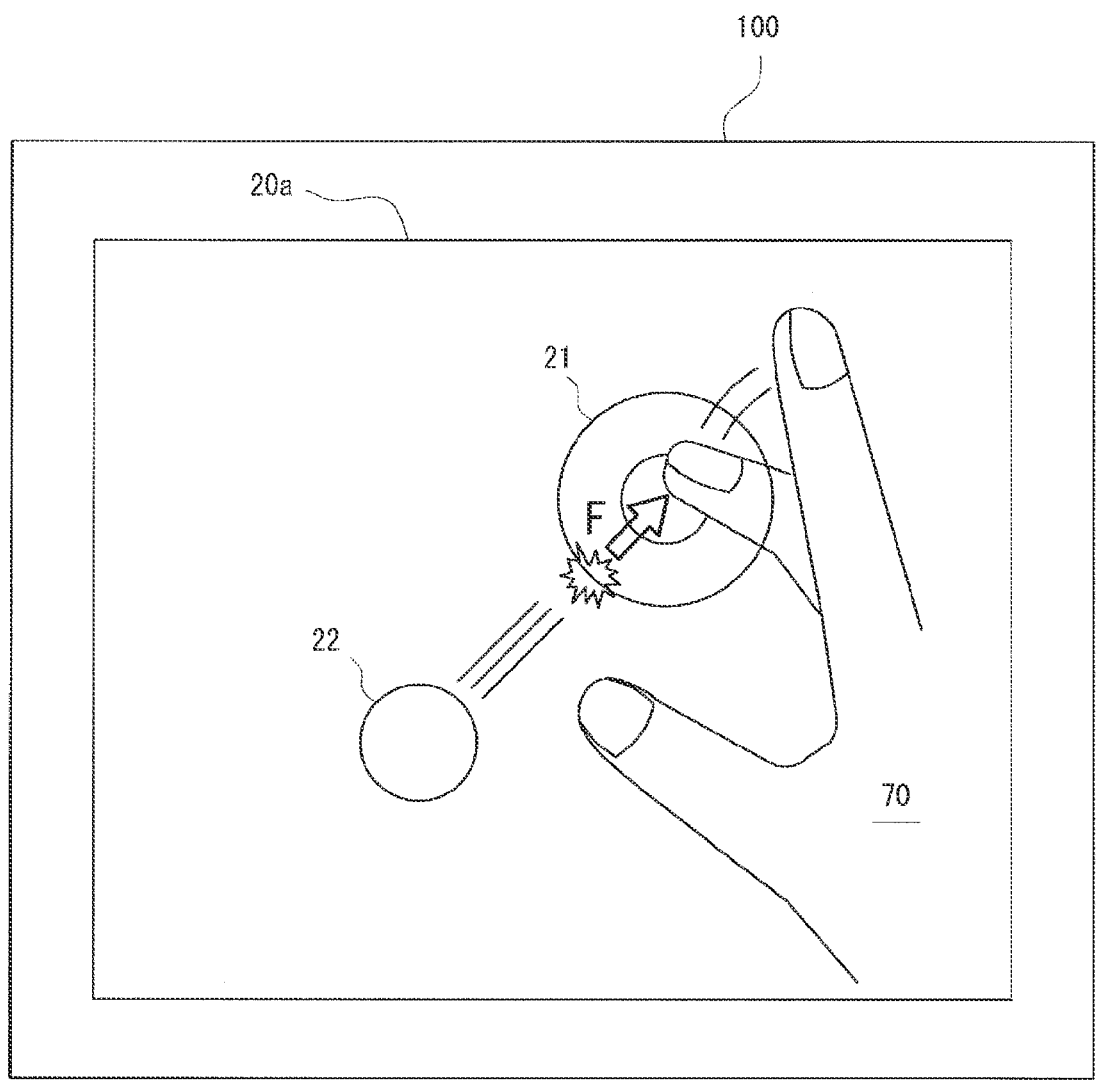
FIG. 6 is a diagram showing an exemplary content used in Embodiment 1 of the present invention.
Figure 7:
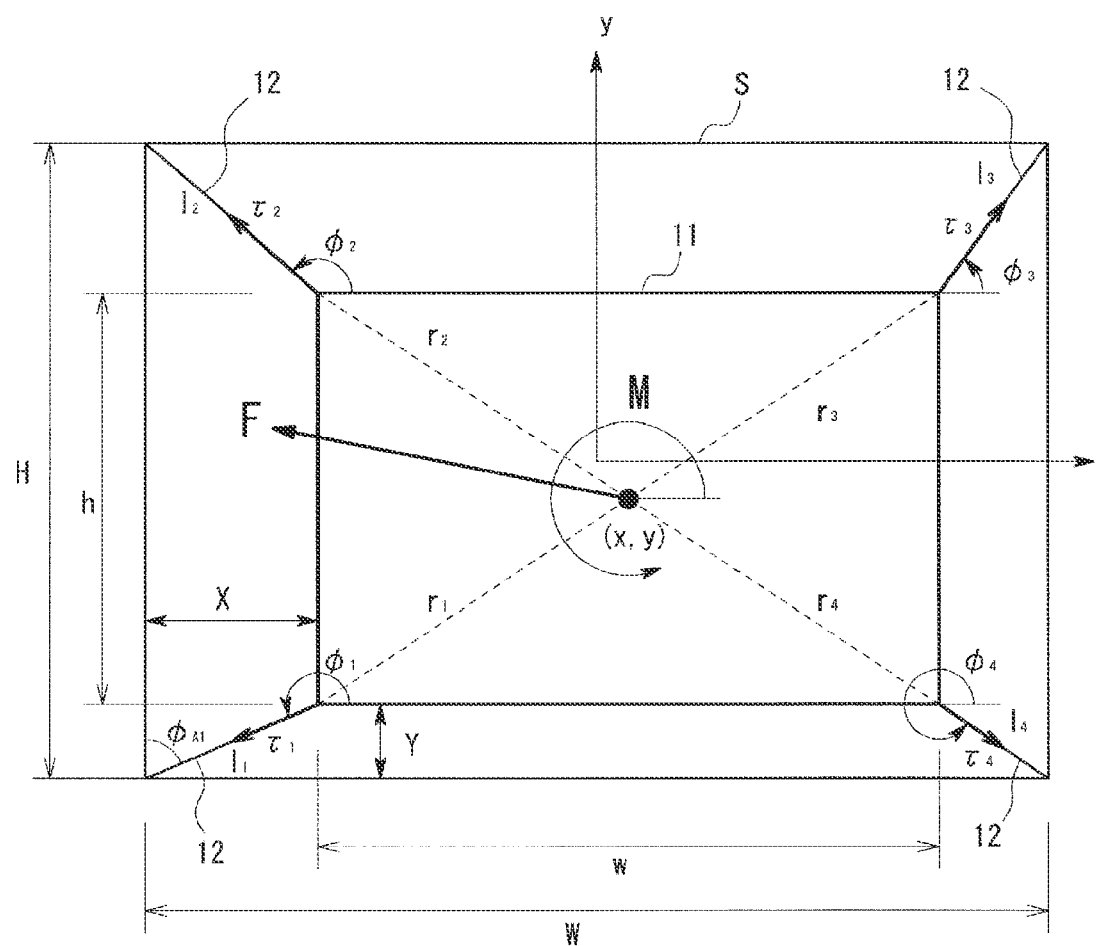
FIG. 7 is a diagram illustrating processing for detecting the position of a haptic sensation producing member shown in FIG. 5.
Figure 8:
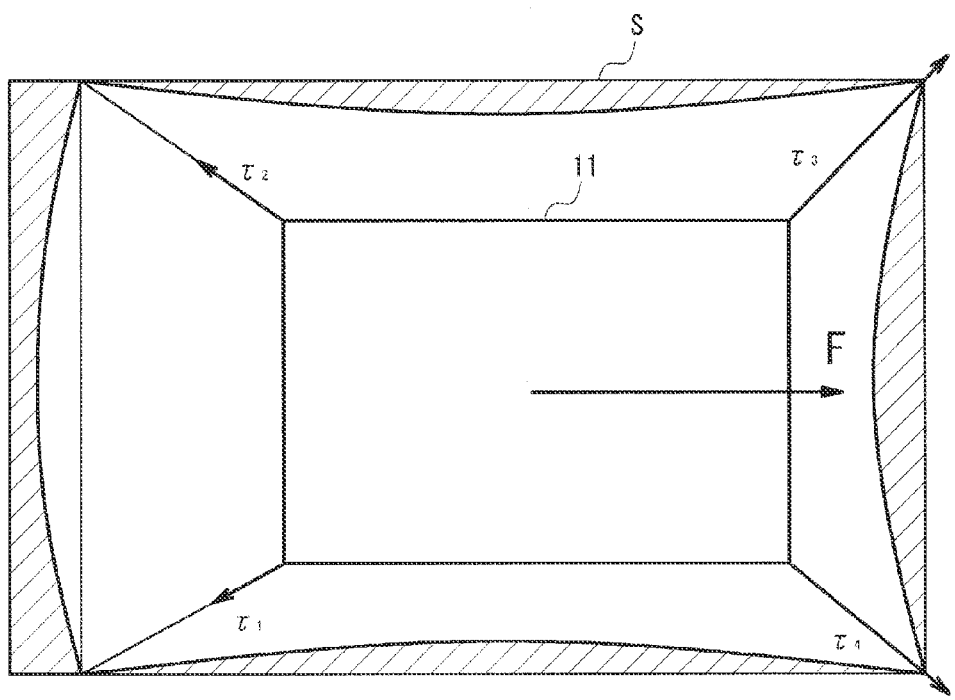
FIG. 8 is a diagram illustrating a case where a limitation is placed on presentation of a haptic sensation in Embodiment 1 of the present invention.

Now, steps S101 to S106 shown in FIG. 5 will be each described in more detail using FIGS. 6 to 8.

Steps S101 and S102

First, steps S101 and S102 will be described in detail using FIG. 6. FIG. 6 is a diagram showing an exemplary content used in Embodiment 1 of the present invention. In the example in FIG. 6, the content is an air hockey game, and the user 70 operates a virtual mallet 21 that exists in the virtual space by his/her finger touch, and hits a virtual puck 22.

Initially, upon the user 70 touching the haptic sensation producing member 11, the touch sensor 30 executes step S101, and outputs the touch detection data a for specifying the touch position to the information processing unit 40.

Then, in step S102, the information processing unit 40 executes the content association processing and associates the movement of the finger, which is a movement in the real space, with the movement of the virtual mallet 21 and the virtual puck 22 in the virtual space.

Specifically, the information processing unit 40 moves the virtual mallet 21 so as to follow the finger movement of the user 70 such that virtual objects in the virtual space and an object (the finger of the user 70) in the real space interact with each other. At this time, the information processing unit 40 simulates the change in the position of the virtual mallet 21 and the virtual puck 22 and a touch force therebetween at the time when the virtual mallet 21 and the virtual puck 22 come into contact with each other, using a physics simulator in the virtual space.

Further, the information processing unit 40 moves the virtual mallet 21 to a designated touch position upon receiving the touch detection data a. At this time, if the virtual mallet 21 is discontinuously moved to the touch position, it is possible that the virtual objects will overlap with each other. In this case, it is difficult to perform accurate simulation.

For this reason, the information processing unit 40 moves the virtual mallet 21 while executing PD (Proportional-Deferential) control for applying, to the virtual mallet 21, a force that is proportional to the distance from the virtual mallet 21 to the touch position and the speed of the virtual mallet 21. When the virtual mallet 21 and the virtual puck 22 come into contact with each other, the information processing unit 40 calculates a reaction force generated therebetween due to contact between the virtual mallet 21 and the virtual puck 22, in accordance with physics coefficients for the virtual mallet 21 and the virtual puck 22 in the virtual space. Note that the physics coefficients include the weight, speed, acceleration, contact direction, a restitution coefficient, and the like of the virtual mallet 21 and the virtual puck 22.

Out of the calculated reaction forces, the reaction force that the virtual mallet 21 receives from the virtual puck corresponds to the haptic sensation to be presented to the user 70 by the haptic sensation producing member 11 (see FIGS. 6 and 7). Accordingly, assuming that the reaction force that the virtual mallet 21 receives from the virtual puck is a "presentation force F", the information processing unit 40 outputs the presentation data b for specifying the presentation force F to the control unit 14 such that the presentation force F is presented by the haptic sensation producing member 11. Further, the information processing unit 40 outputs data for displaying the movement of the virtual mallet 21 and the virtual puck 22 as the display data e, which is display information, to the display panel 20.

Step S103

Next, step S103 will be described in detail using FIG. 7. FIG. 7 is a diagram illustrating processing for detecting the position of the haptic sensation producing member shown in FIG. 5. In step S103 in Embodiment 1, the control unit 14 calculates the coordinates (x, y) of the center of the haptic sensation producing member 11, based on the position detection data c that is output by the sensors 15.

In the example in FIG. 7, the origin (0, 0) of the coordinates is set to the center of a rectangle S. In the haptic sensation producing member 11 in FIG. 7, the through holes 11c for attaching the wires 12 are located at the respective corners. Furthermore, in the rectangle S shown in FIG. 7, the distance from a corner of the haptic sensation producing member 11 to the corresponding corner of the rectangle S in FIG. 7 is set so as to correspond to the length of the corresponding wire 12 (i.e., the length from the through hole 11c to the position where the wire 12 comes into contact with the pulley 13b). That is to say, the four corners of the rectangle S represent the positional relationship between the pulleys 13b for reeling in the wires 12 in the respective wire tensile units 13.

In FIG. 7, reference character H denotes the vertical length of the rectangle S, and reference character W denotes the horizontal length of the rectangle S. Reference character h denotes the vertical length of the haptic sensation producing member 11, and reference character w denotes the horizontal length of the haptic sensation producing member 11.

In step S103, initially, upon the position detection data c being output from the sensors 15, the control unit 14 calculates the lengths 14 to 14 of the respective wires 12 based on the position detection data c, which indicates the numbers of rotations of the motors 13*a*. In FIG. 7, since H, W, h, and w are known lengths, the control unit 14 calculates the coordinates (x, y) using these lengths and $l_1$ to $l_4$. In step S103, the control unit 14 also calculates angles ($\phi_1$ to $\phi_4$) of the respective wires 12, which are used in calculation of the tensile forces in step S104.

Now, the processing for calculating the coordinates (x, y) will be described in more detail. In FIG. 7, assuming that the angle between the wire 12 having the length of $l_1$ and the short side of the rectangle S is $\phi_{A1}$, Expressions 1 and 2 below hold, based on the law of cosines.

$$\cos\phi_{A1} = \frac{(H-h)^2 + l_1^2 - l_2^2}{2(H-h)l_1}$$ [Expression 1]

$$\phi_{A1} = \cos^{-1}\left\{\frac{(H-h)^2 + l_1^2 - l_2^2}{2(H-h)l_1}\right\}$$ [Expression 2]

Accordingly, the control unit 14 calculates $\phi_{A1}$ by applying the lengths 14 and 12 of the wires to Expression 1 and Expression 2, and further calculates $\phi_1$ using Expression 3 below. The control unit 14 also applies the calculated $\phi_{A1}$ to Expression 4 below to calculate the coordinates (x, y). $\phi_2$ to $\phi_4$ are also calculated by the same processes.

$$\phi_1 = 180 + (90 - \phi_{A1})$$ [Expression 3]

$$(x, y) = \left(l_1\sin\phi_{A1} + \frac{w}{2} - \frac{W}{2}, l_1\cos\phi_{A1} + \frac{h}{2} - \frac{H}{2}\right)$$ [Expression 4]

Step S104

Next, step S104 will be described in detail using FIG. 7. In FIG. 7, the positions of the four vertices of the haptic sensation producing member 11 are represented by position vectors based on the center of gravity of the haptic sensation producing member 11, that is, $r_1$, $r_2$ $r_3$, and $r_4$.

If the haptic sensation producing member 11 is a rectangle, the directions of the respective position vectors $r_1$, $r_2$, $r_3$, and $r_4$ are determined by the vertical length h and the horizontal length w of the haptic sensation producing member 11. Further, since the distances from the center of gravity to the vertices are the same, the amounts of the position vectors are the same. Furthermore, in FIG. 7, reference character M denotes the moment for rotating the haptic sensation producing member 11 around the center of gravity thereof, and the moment M is generated in accordance with the balance between tensile forces $\tau_1$ to $\tau_4$.

In step S104, the control unit 14 calculates the tensile forces $\tau_1$ to $\tau_4$ to be output by the respective wire tensile units 13, using the presentation data b that is output in step S102, and the coordinates (x, y) and $\phi_1$ to $\phi_4$ that are calculated in step S103. Then, to generate the presentation force F to be presented, the control unit 14 outputs the control data d for generating the calculated tensile forces to the respective wire tensile units 13.

In Embodiment 1, the control unit 14 calculates the tensile forces $\tau_1$ to $\tau_4$ such that conditions (a) to (d) below are satisfied.

(a) The resultant force of the tensile forces $\tau_1$ to $\tau_4$ coincides with the force generated on the object (the virtual mallet 21: see FIG. 6) in the virtual space, that is, the presentation force F calculated in step S102.

(b) The moment M generated on the haptic sensation producing member 11 by the tensile forces $\tau_1$ to $\tau_4$ coincides with the moment generated on the object in the virtual space.

(c) The tensile forces $\tau 1$ to $\tau 4$ are within the range from the minimum tensile force $\tau_{min}$ at which the wires 12 are not loosened to the set maximum tensile force $\tau_{max}$.

(d) The total value of the tensile forces $\tau_1$ to $\tau_4$ is the lowest value in the range with which the conditions (a) to (c) are satisfied.

Incidentally, in Embodiment 1, the number of degrees of freedom in the conditions for constraining the haptic sensation producing member 11 is three, but the tensile force that can be output by each wire tensile unit 13 has four degrees of freedom, which is redundant. For this reason, the tensile forces $\tau_1$ to $\tau_4$ need to be optimized using an optimizing calculation method, and the above condition (d) is set. The following is a detailed description of the conditions (a) to (d).

The condition (a) can be represented by Expression 5 below. As indicated in Expression 5, the resultant force of the tensile forces $\tau_1$ to $\tau_4$ is the sum of inner products of the tensile forces for the respective wire tensile units 13 and the angles of the corresponding wires 12. Accordingly, the sum of the inner products needs to coincide with the target presentation force F $$\sum_{i=1}^{4} \tau_i \Phi_i = F$$ [Expression 5]

The moment M in the condition (b) is set to 0 (zero) in Embodiment 1. Accordingly, the condition (b) can be represented by Expression 6 below. As indicated in Expression 6, the moment M is the sum of outer products of the respective position vectors $r_1$ to $r_4$ and components of the tensile forces in directions extending from the respective corners of the haptic sensation producing member 11 toward the center of gravity. This sum of the outer products needs to be 0 (zero). Note that if it is desired to generate a set moment on the haptic sensation producing member 11, Expression 6 obtained by substituting an arbitrary value for the value of M can be used.

$$\sum_{i=1}^{4} r_i \times \tau_i \Phi_i = M = 0$$ [Expression 6]

The condition (c) is set in order to prevent the haptic sensation producing member 11 from becoming unable to move parallel to the xy plane due to any wire being loosened. Further, if the tensile force is too large, the corresponding wire may possibly be become disconnected, and accordingly, the maximum value of the tensile force is set with the condition (c). The condition (c) can be represented by Expression 7 below.

$$0 < \tau_{min} \leq \tau_i \leq \tau_{max}$$ [Expression 7]

The condition (d) is set in order to optimize the tensile forces $\tau_1$ to $\tau_4$ as described above, that is, to minimize energy consumption by the wire tensile units 13. If the condition (d) is not set, the tensile forces $\tau_1$ to $\tau_4$ may possibly become needlessly large.

The condition (d) can be represented by Expression 8 below. The function shown as Expression 8 aims for increasing the efficiency of the wire tensile units 13 while minimizing the sum of the tensile forces thereof. Reference character J is a target function value that is set in order to perform optimization. The tensile forces $\tau_1$, $\tau_2$, $\tau_3$, and $\tau_4$ are calculated such that J is minimized. Linear programming, which is one optimizing calculation method, is executed by using the function shown as Expression 8.

$$\min: J = \sum_{i=1}^{4} \tau_i \qquad \text{[Expression 8]}$$

As a result of calculating the tensile forces $\tau_1$ to $\tau_4$ such that the above-described conditions (a) to (d) are satisfied, the tensile forces have the optimum values for presenting the target presentation force F. However, the wire tensile units 13 transmit forces via the wires 12, and are configured to be able to present the forces only by pulling the wires 12. Accordingly, a limitation may possibly be placed on the presentable haptic sensation, depending on the position of the haptic sensation producing member 11, due to the positional relationship between the wire tensile units. In this case, the control unit 14 executes exception handling, which will be described below.

Now, a case where a limitation is placed on the presentable haptic sensation will be described using FIG. 8. FIG. 8 is a diagram illustrating a case where a limitation is placed on presentation of a haptic sensation in Embodiment 1 of the present invention.

In the example in FIG. 8, the case where a limitation is placed on the presentation of a haptic sensation is indicated by hatched areas. That is to say, the presentable haptic sensation is limited if at least a part of the haptic sensation producing member 11 enters any of the hatched areas.

Specifically, as shown in FIG. 8, assuming that the presentation force to be presented is "F", if the haptic sensation producing member 11 is located near the center of the rectangle S, the presentation force F can be presented by the resultant force of the tensile forces $\tau_1$ to $\tau_4$.

On the other hand, it is assumed that the haptic sensation producing member 11 is located near the right edge of the rectangle S in FIG. 8, and a part of the haptic sensation producing member 11 has entered the hatched area. In this case, based on the positional relationship between the wire tensile unit 13 that outputs $\tau_3$ and the wire tensile unit 13 that outputs $\tau_4$, the values obtained as $\tau_3$ and $\tau_4$ exceed the maximum value of the tensile force that can be generated by the wire tensile units 13, and the presentation force F to be presented cannot be output.

Furthermore, the areas where a force cannot be presented in an arbitrary direction in FIG. 8 depend on the position (x, y) of the haptic sensation producing member 11, the magnitude of the presentation force F to be presented, the positional relationship between the wire tensile units 13, and further, the maximum value and the minimum value of the tensile force that can be output by each wire tensile unit 13, and the extent of the areas may vary.

Incidentally, JP 2003-172662A discloses a conventional haptic sensation producing device. In the haptic sensation producing device (hereinafter referred to as the "conventional haptic sensation producing device") disclosed in JP 2003-172662A, a ball-like haptic sensation producing member is three-dimensionally disposed in the real space in front of a display panel. In this case as well, the haptic sensation producing member is held by wires, and tensile forces are exerted on the respective wires.

In this conventional haptic sensation producing device as well, there is an area where a force can be presented in an arbitrary direction and an area where a force cannot be presented in an arbitrary direction. Since a coefficient $Y_t$ is set that determines the relative importance of the accuracy in the torque of the tensile forces, the calculation result will continuously change at the boundary between the two areas. That is to say, with the conventional haptic sensation producing device, it is also conceivable that discontinuous change of the calculation results of the tensile forces is suppressed at the boundary between the presentable area and the unpresentable area.

However, with the conventional haptic sensation producing device, the stability at the boundary between the area where a force can be presented in an arbitrary direction and the area where a force cannot be presented in an arbitrary direction and the accuracy of the presentation force F to be presented are in a trade-off relationship. Accordingly, with the conventional haptic sensation producing device, if the calculation for obtaining the stability is executed using the coefficient $Y_t$, a problem arises in that the accuracy of the presentation force F to be presented is reduced.

Now, the reason why the aforementioned problem arises with the conventional haptic sensation producing device is examined. First, with the conventional haptic sensation producing device, minimization of the difference between the resultant force of the tensile forces for the motors and the presentation force F to be presented is handled as an objective function of the optimization. Furthermore, a second-order objective function is also set such that the value of the difference is not negative. That is to say, with the conventional haptic sensation producing device, the area where a force can be presented in an arbitrary direction is not mathematically defined, and consequently, it is difficult to solve the above problem.

Further, with the conventional haptic sensation producing device, the second-order objective function is set as mentioned above, and the optimum tensile forces are calculated by quadratic programming. For this reason, it is necessary to converge the tensile forces on an optimum calculated value by repeating calculation, which takes longer calculation time. Further, since the tensile forces are not necessarily converged by repeating calculation such that a true optimum calculated value is calculated, it cannot be guaranteed that the obtained converged value is the tensile force with which the presentation force F to be presented can be output.

On the other hand, in Embodiment 1, the control unit 14 performs calculation by linear programming with a first-order objective function, as described above. For this reason, the haptic sensation producing member 11 being in the area where a force can be presented in an arbitrary direction has the same meaning as existence of a solution that satisfies the constraints (conditions (a) to (d)). Accordingly, if a solution that satisfies the constraints does not exist, the control unit 14 determines that the haptic sensation producing member 11 exists in the area where a force cannot be presented in an arbitrary direction.

Consequently, if the position of the haptic sensation producing member 11 overlaps with the area where a force cannot be presented in an arbitrary direction, the control unit 14 can handle the discontinuity of the solution in a boundary area by performing the exception handling. Such processing is possible with the control unit 14 since the calculation for distributing the tensile force is performed by linear programming with the constraint that the resultant force of the tensile forces for the wire tensile units 13 coincides with the presentation force F to be presented, and also with the objective function that is the efficiency of the wire tensile units 13.

Further, in the case of using linear programming, the optimum calculated value is always determined to be a unique value. For this reason, if the haptic sensation producing member 11 is within the area where the presentation force can be presented in an arbitrary direction, the resultant force of the tensile forces for the wire tensile units 13 coincides with the presentation force F to be presented. Accordingly, in this case, a correct haptic sensation can be always presented. Further, when using linear programming, it is known that a solution is obtained by repeating the calculation for a limited number of times. Accordingly, the calculation cost is small, and the reaction speed at which a haptic sensation is presented to the user can also be increased.

Further, in the exception handling, the control unit 14 can use the respective tensile forces as set values to control the wire tensile units 13 based on the set values, for example.

That is to say, in the boundary area between the area where a force can be presented in an arbitrary direction and the area where a force cannot be presented in an arbitrary direction, two wire tensile units 13 that are located near the haptic sensation producing member 11 output the maximum tensile force, regardless of the magnitude of the presentation force F. Further, in the boundary area, two wire tensile units 13 located away from the haptic sensation producing member 11 output the minimum tensile force.

For this reason, in the area where a force cannot be presented in an arbitrary direction, the continuity of the solution in the boundary area can be maintained by fixing the output values in accordance with the positional relationship between the haptic sensation producing member 11 and the respective wire tensile units 13. As a result, the haptic sensation producing member 11 can continuously and stably present a haptic sensation to the user, even when the haptic sensation producing member 11 is in the boundary area.

In Embodiment 1, the exception handling at the boundary between the area where a force can be presented in an arbitrary direction and the area where a force cannot be presented in an arbitrary direction need only be processing by which the output of the wire tensile units 13 continuously varies, and the processing method is not limited.

For example, it is assumed that the haptic sensation producing member 11 moves from the area where a force can be presented in an arbitrary direction to the area where a force cannot be presented in an arbitrary direction, and the optimum solutions of the tensile forces $\tau_1$, $\tau_2$, $\tau_3$, and $\tau_4$ of the wire tensile units 13 cannot be calculated. In this case, the control unit 14 may perform, as the exception handling, control with which the respective wire tensile units 13 maintain their latest tensile forces at the time when the optimum solutions was able to be calculated.

Step S105 and step S106

Next, steps S105 and S106 will be described in detail. As described above, a haptic sensation is presented in step S105, and the content resulting from the content association processing is displayed in step S106. Specifically, the display panel 20 receives the display data e that was output by the information processing 40 in step S102, and displays the content in which the object has changed, on its display screen. Upon the wire tensile units 13 generating the tensile forces $\tau_1$ to $\tau_4$ calculated in step S104, the corresponding wires 12 are pulled, the haptic sensation producing member 11 moves, and the presentation force F is presented to the fingertip of the user 70. Thus, the user 70 can feel a touch at his/her fingertip as if he/she is actually touching the object.

Program

A program according to Embodiment 1 need only be configured to cause a computer to execute steps S103 to S105 that are shown in FIG. 5. The haptic sensation producing device 10 and the haptic sensation producing method according to Embodiment 1 are realizable by installing this program on a computer and executing the installed program. In this case, a CPU (Central Processing Unit) of the computer functions as the control unit 14 and performs processing.

The computer that can realize the haptic sensation producing device 10 is not particularly limited, and may be the aforementioned microcomputer, or may be a general-purpose personal computer. Furthermore, the computer that can realize the haptic sensation producing device 10 may be a computer provided in a mobile phone, a smartphone, or a tablet-type information terminal.

The program according to Embodiment 1 may be provided in a state of being stored in a computer-readable recording medium, or may be transmitted via the Internet. A general-purpose semiconductor storage device such as CF (Compact Flash (registered trademark)) or SD (Secure Digital), a magnetic storage medium such as a flexible disk, and an optical storage medium such as CD-ROM (Compact Disk Read Only Memory) are specific examples of the recording medium.

Effect of Embodiment 1

According to Embodiment 1, the following effects are achieved as a result of using the haptic sensation presenting mechanism using wires and the optimizing calculation method for generating a haptic sensation.

Firstly, in Embodiment 1, since wires are used as a mechanism for transmitting a force from the actuator, lightweight parts can be used as constituent parts of the haptic sensation producing device, and furthermore, the configuration of the transmission mechanism can be simplified. Accordingly, according to Embodiment 1, a reduction in the size and weight of the entire device can be achieved.

In Embodiment 1, due to the high flexibility in designing of the transmission direction and the length of the wires serving as the transmission mechanism, a layout of the parts with which the actuator and other constituent components do not interfere with each other can be easily realized.

Furthermore, in Embodiment 1, the optimizing calculation for generating a haptic sensation can be performed with linear programming. Accordingly, the calculation cost can be reduced, and the reaction speed at which a haptic sensation is presented to the user can be increased.

There are cases where a limitation is placed on the presentable haptic sensation (presentation force) due to the position of the haptic sensation producing member 11, depending on the positional relationship between the wire tensile units 13. However, in Embodiment 1, such cases can be distinguished from other cases, and accordingly, the haptic sensation can be presented continuously and stably even at the boundary between those areas.

In Embodiment 1, the haptic sensation producing member 11 is pulled in four directions by the wires, and moreover, the pulling direction of each wire is not fixed to one direction, and is variable. Accordingly, the area where the haptic sensation producing member 11 can move can be set widely.

Embodiment 2

Figure 9:
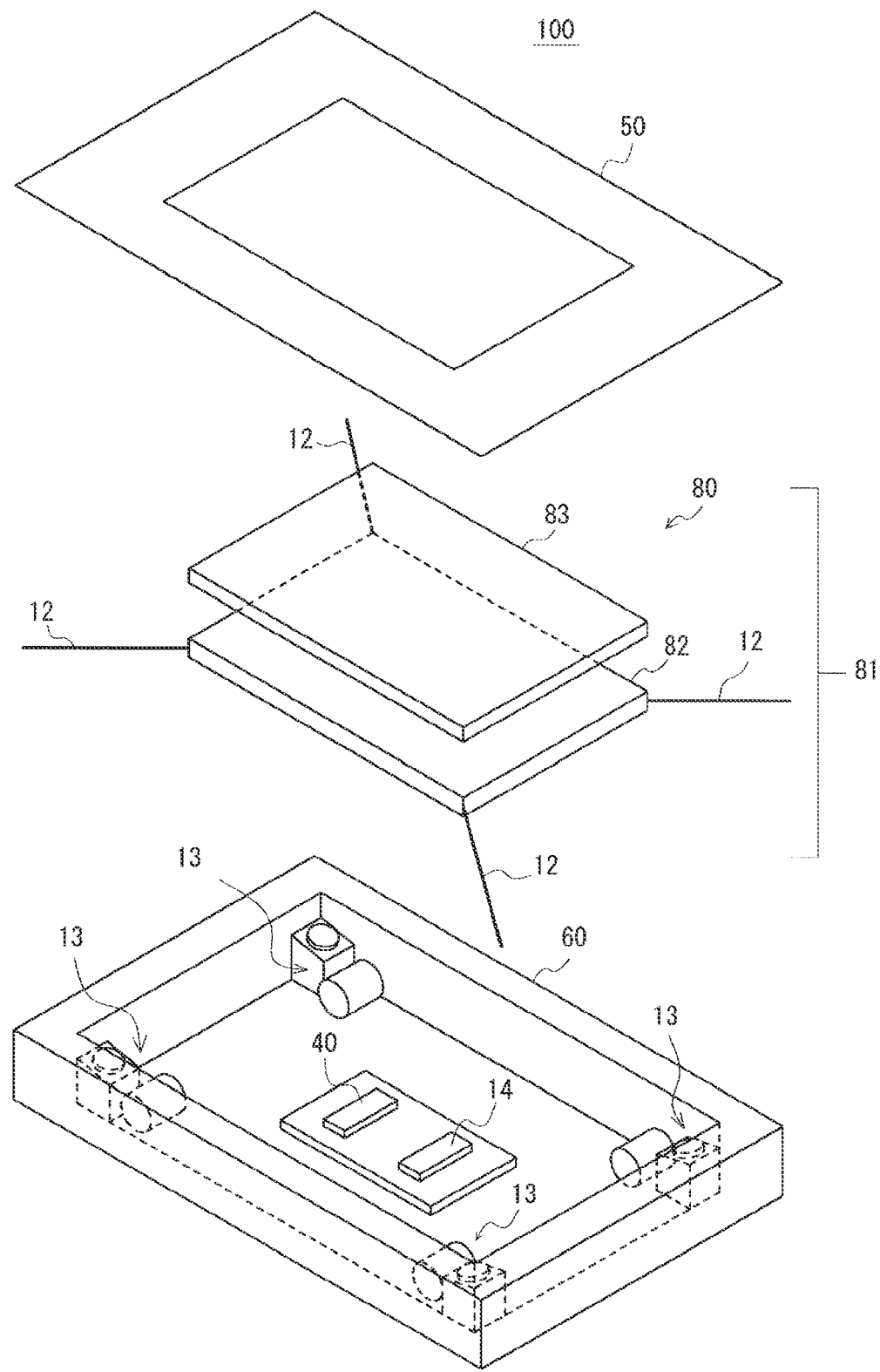
FIG. 9 is an exploded perspective view showing constituent components of an information terminal according to Embodiment 2 of the present invention.

Hereinafter, a haptic sensation producing device, an information terminal, a haptic sensation producing method, and a program according to Embodiment 2 of the present invention will be described with reference to FIG. 9. FIG. 9 is an exploded perspective view showing constituent components of the information terminal according to Embodiment 2 of the present invention.

As shown in FIG. 9, a haptic sensation producing device 80 according to Embodiment 2 is different from the haptic sensation producing device 10 according to Embodiment 1 shown in FIGS. 1 to 3 in the configuration of a haptic sensation producing member 81. In Embodiment 2, a configuration in which the haptic sensation producing member 81 includes a display panel 82 is employed.

Specifically, in Embodiment 2, the display panel 82 for displaying a content functions as the haptic sensation producing member 81. Further, a touch panel 83 is used as a touch sensor, and the touch panel 83 is fixed to the front face of the display panel 82 for displaying a content. Accordingly, the touch panel 83, together with the display panel 82, functions as the haptic sensation producing member 81.

Wires 12 are attached to four corners of the display panel 82, and wire tensile units 13 pull the corresponding wires 12, as in Embodiment 1. Accordingly, as in Embodiment 1, the control unit 14 can move the display panel 82, which serves as the haptic sensation producing member 81, by controlling the wire tensile units 13, and therefore, a haptic sensation is presented to a user in Embodiment 2 as well.

In Embodiment 2, the display panel 82 thus moves with respect to a casing 60, which causes the display screen to move together with it. Accordingly, in order to prevent an image of the content from moving in conjunction with the display panel 82 as viewed by the user, an information processing unit 40 can execute processing for displaying the image of the content so as to move the image in a direction opposite to the moving direction of the display panel 82.

Further, in Embodiment 2, the operation of the information processing unit 40 and the control unit 14 is the same as that in Embodiment 1, and steps S101 to S106 shown in FIG. 5 are executed. As a result of steps S103 to S105 being executed in the haptic sensation producing device 80, the haptic sensation producing method according to Embodiment 2 is carried out. A program according to Embodiment 2 also need only cause a computer to execute steps S103 to S105 that are shown in FIG. 5.

In the case of using Embodiment 2, the display panel 82 can be used as the haptic sensation producing member, as described above. Accordingly, the configuration can be simplified as compared with Embodiment 1, and a reduction in the manufacturing cost can be promoted. Further, in Embodiment 2 as well, the haptic sensation presenting mechanism using the wires and the optimizing calculation method are employed as in Embodiment 1, and accordingly, the effects described in Embodiment 1 can be achieved.

Modifications

Subsequently, various modifications of the above-described Embodiment 1 and Embodiment 2 will be described below.

In the above-described Embodiments 1 and 2, the actuators of the wire tensile units 13 are not limited to motors, and need only have a configuration that enables the wire tensile units 13 to pull the wires 12. Actuators, such as artificial muscle actuators and fibrous shape memory alloy actuators, that have a shape similar to the wire shape and perform an extending operation are given as other actuators.

In the above-described Embodiments 1 and 2, as shown in FIG. 3, the tensile force direction conversion pulleys 13*c*, each serving as the starting point of the pulling when the wires 12 are pulled toward the casing 60, are disposed such that a rectangle that coincides with the shape of the casing 60 is formed when these tensile force direction conversion pulleys 13*c* are connected by lines. However, in Embodiments 1 and 2, the positions of the starting points of the pulling are not particularly limited, and the starting points of the pulling may be disposed such that a parallelogram or a trapezoid is formed when these starting points are connected by lines, for example. The starting points of the pulling does not need to be located in the same plane, and the number thereof does not need to be four.

Although the haptic sensation producing member is driven by four wires in the above-described Embodiments 1 and 2, the number of wires is not particularly limited. For example, in the case of moving the haptic sensation producing member in an arbitrary direction in a plane to present a haptic sensation, the number of wires 12 may be at least three.

Furthermore, if the haptic sensation producing member is moved in an arbitrary linear direction to present a haptic sensation, the number of wires may be two. If the haptic sensation producing member is moved using the balance with an external force such as gravity to present a haptic sensation, the number of wires may be one. In addition, if the haptic sensation producing member 11 is moved or rotated in an arbitrary direction in a plane and in a three-dimensional space to present a haptic sensation, the number of wires may also be four or more.

Although an example is described in which a haptic sensation is presented when an object moves in the virtual space in conjunction with the movement of a finger of a user (see FIG. 6) in the above-described Embodiments 1 and 2, Embodiments 1 and 2 are not limited thereto. Embodiments 1 and 2 are also applicable to the case where an object undergoes a change other than movement, e.g., the case where the shape, color, size, or the like of an object changes. Further, the haptic sensation to be presented may be varied depending on the object subjected to a user operation.

Although the information processing unit 40 for performing processing for displaying a content is accommodated together with the display panel, the touch sensor, and the haptic sensation producing device in the same casing in the above-described Embodiments 1 and 2, Embodiments 1 and 2 are not limited thereto. In Embodiments 1 and 2, the information processing unit 40 may be realized by a computer such as an external personal computer. In this case, the control unit 14 may also be realized by the computer that realizes the information processing unit.

Exemplary Application

Subsequently, various exemplary applications of the above-described Embodiment 1 and Embodiment 2 will be described below.

The haptic sensation producing device according to Embodiments 1 and 2 is applicable to navigation for travelling. For example, when navigating a walking user to a destination, the haptic sensation producing device can present the direction in which the user is to proceed, by means of a haptic sensation to the touching finger of the user. In this case, the navigation direction is the information to be presented as a content.

The haptic sensation producing device according to Embodiments 1 and 2 can provide a more tangible feeling of operation to the user by presenting a haptic sensation in conjunction with the movement of a scrolled screen. For example, regarding screen scrolling, a display method is known with which, if a screen cannot be scrolled since no more information is contained, a user is notified that scrolling is impossible by bouncing the display screen in a scrolling direction. In the case of employing this display method, if a haptic sensation is presented in conjunction with the bouncing of the display screen, the user can receive information more tangibly, quickly, and accurately.

In the case where the displayed content is a website, the haptic sensation producing device according to Embodiments 1 and 2 can present a link button or the like that exists under the touching finger by means of a haptic sensation. In this case, the user can receive information that is difficult to obtain only with displayed information. Furthermore, if a harmful site is contained at the link destination, the haptic sensation producing device can issue a warning by presenting a haptic sensation so as to make it difficult for the user to press the Link button.

The haptic sensation producing device according to Embodiments 1 and 2 can be used not only for presenting a haptic sensation in conjunction with a virtual object (virtual body), but also for providing a movement reaction to an input operation given to a master-slave system robot arm or the like. For example, in the case where a user operates a real body by remotely operating a robot arm while viewing a screen, the haptic sensation producing device can present a haptic sensation as a reaction to contact with an obstacle, a warning before coming into contact with an obstacle, or the like. In this case, the user can operate the robot arm more safely and accurately.

The haptic sensation producing device according to Embodiments 1 and 2 can be used to read the a state of a tactile map or the like. In other words, the haptic sensation producing device can be used by the visually handicapped to read a map. Further, when a general user attempts to find walls and routes in a three-dimensional maze or the like, if haptic sensations corresponding to the walls and routes are presented by the haptic sensation producing device, it is easy for the user to find out the shape and state.

The haptic sensation producing device according to Embodiments 1 and 2 can be used to present information of the stroke order of Chinese characters in character learning. For a child to understand the stroke order of characters in the learning of Chinese characters, the haptic sensation producing device can present a resistance force as a haptic sensation in response to input in an incorrect input direction, when the stroke order, brush jump, upward turn, or the like is incorrect. The haptic sensation producing device is useful in assistance of character learning.

The haptic sensation producing device according to Embodiments 1 and 2 can present a haptic sensation that is moved in a direction parallel to the display panel, as feedback with a touch of clicking during device operation. Since feedback with a haptic sensation is important in key input operation, the haptic sensation producing device can change the feedback such that a user can easily understand the feedback. Furthermore, in the case where user input changes, the haptic sensation producing device can notify the user of the change in input by providing feedback with a touch that is different from the usual touch of clicking.

An input method called flicking is known as a method for inputting a character on a touch panel. With flicking, the input character is determined by the position touched by a finger and the direction in which the finger slides. If the haptic sensation producing device according to Embodiments 1 and 2 is applied to this flicking, a haptic sensation can be presented such that the finger can easily slide only in the sliding direction, and resistance is generated in directions in which sliding is impossible, against the finger movement. In this case, the user can be prevented from making an incorrect movement when selecting a character, and input of a character is facilitated.

The haptic sensation producing device according to Embodiments 1 and 2 can be used as a feedback device in a simulation of playing of a music instrument such as the piano, a simulation of a surgical operation, or a simulation of clay molding. That is to say, the haptic sensation producing device can present a haptic sensation as device feedback with respect to input, as part of an entertainment or preliminary learning of use of a device.

The haptic sensation producing device according to Embodiments 1 and 2 can be used to recognize a state of a product when the product is purchased at a place other than a real shop, such as at a website or on a television. Unlike the purchase of a product at a real shop, a problem arises regarding the actual feel of the product when the product is purchased on a website or on a television. For this reason, with the haptic sensation producing device, the user can obtain information regarding an actual feel of the product, and can make a purchase after having a better understanding of the product.

The haptic sensation producing device according to Embodiments 1 and 2 can be used for entertainment, such as in understanding an optical illusion picture. In this case, the haptic sensation producing device presents a sense of incongruity to a user by giving a user a haptic sensation that does not match visual information as presented information. For example, Maurits Cornelis Escher's optical illusion picture of a continuous spiral staircase cannot be actually touched, but a touch of a body in a virtual space can be presented by the haptic sensation producing device, and accordingly, the user can touch the optical illusion picture.

Although the claimed invention has been described above with reference to the embodiments, the claimed invention is not limited to the above embodiments. Those skilled in the art will appreciate that various modifications can be made to the configurations and details of the claimed invention within the scope of the claimed invention.

This application is based upon and claims the benefit of priority of the prior Japanese Patent Application No. 2011-266323 filed on Dec. 5, 2011, the entire contents of which are incorporated herein by reference.

INDUSTRIAL APPLICABILITY

According to the present invention, a reduction in the size and weight of a haptic sensation producing device and an information terminal equipped with the haptic sensation producing device can be achieved, and in addition, a highly expressive haptic sensation can be presented. The present invention is useful in various fields in which presentation of a haptic sensation is required, e.g., in computer interfaces, various kinds of simulation, games, and the like.

DESCRIPTIONS OF REFERENCE NUMERALS

10 Haptic sensation producing device
11 Haptic sensation producing member
11a, 11b Projecting portion
11c Through hole
12 Wire
13 Wire tensile unit
13a Motor
13b Pulley for reeling in wire
13c Tensile force direction conversion pulley
14 Control unit
15 Sensor
20 Display panel
21 Virtual mallet
22 Virtual puck
23 Support panel
30 Touch sensor
30a Frame
30b Light-emitting device 30c Light-receiving device
40 Information processing unit
41 Content data
50 Cover
60 Casing
70 User
110 Information terminal

The invention claimed is:

1. A haptic sensation producing device for presenting a haptic sensation to a user in accordance with a content displayed on a display panel, comprising:
   a panel-like haptic sensation producing member;
   a plurality of wires for holding the haptic sensation producing member;
   wire tensile units that are provided for the respective wires and pull the corresponding wires; and
   a control unit that controls the wire tensile units and moves the haptic sensation producing member along a front face of the display panel to generate the haptic sensation,
   wherein if a change occurs in an object included in the content as a result of the user touching the haptic sensation producing member, the control unit calculates tensile forces for the respective wire tensile units such that the haptic sensation conforming to the change of the object can be generated and such that the tensile forces are optimized, and controls the wire tensile units based on the calculated tensile forces,
   wherein the control unit calculates the tensile forces so as to satisfy conditions that:
   (a) a resultant force of the tensile forces coincides with a force generated on the object in a virtual space;
   (b) a moment generated on the haptic sensation producing member by the tensile forces coincides with a moment generated on the object in the virtual space;
   (c) each of the calculated tensile forces is within a range from a minimum tensile force with which the wires are not loosened to a set maximum tensile force; and
   (d) a total value of the tensile forces is a lowest value in a range within which the conditions (a) to (c) are satisfied,
   wherein when each of the plurality of wires is pulled with a same tensile force, connection points of the plurality of wires with the haptic sensation producing member result in no movement of the haptic sensation producing member.

2. The haptic sensation producing device according to claim 1,
   wherein the control unit detects a position of the haptic sensation producing member based on a distance from each wire tensile unit to a point where the wire corresponding thereto is connected to the haptic sensation producing member, and if the detected position is a position at which a limitation is placed on the haptic sensation due to a positional relationship between the wire tensile units, the control unit uses the tensile forces as set values and controls the wire tensile units based on the set values.

3. The haptic sensation producing device according to claim 1,
   wherein the control unit calculates the tensile forces such that a moment force generated on the haptic sensation producing member by the tensile forces is zero.

4. The haptic sensation producing device according to claim 1,
   wherein the haptic sensation producing member is disposed on a front face side of the display panel.

5. The haptic sensation producing device according to claim 1,
   wherein the haptic sensation producing member includes the display panel.

6. An information terminal equipped with a display panel that displays a content, a touch sensor that detects a position that is touched by a user, an information processing unit that changes an object included in the content in accordance with the position detected by the touch sensor, and a haptic sensation producing device capable of presenting a haptic sensation to the user in accordance with the content,
   the haptic sensation producing device comprising:
   a panel-like haptic sensation producing member;
   a plurality of wires for holding the haptic sensation producing member;
   wire tensile units that are provided for the respective wires and pull the corresponding wires; and
   a control unit that controls the wire tensile units and moves the haptic sensation producing member along a front face of the display panel to generate the haptic sensation,
   wherein if the user touches the haptic sensation producing member and the information processing unit changes the object included in the content in accordance with the position detected by the touch sensor, the control unit calculates tensile forces for the respective wire tensile units such that the haptic sensation conforming to the change of the object can be generated and such that the tensile forces are optimized, and controls the wire tensile units based on the calculated tensile forces,
   wherein the control unit calculates the tensile forces so as to satisfy conditions that:
   (a) a resultant force of the tensile forces coincides with a force generated on the object in a virtual space;
   (b) a moment generated on the haptic sensation producing member by the tensile forces coincides with a moment generated on the object in the virtual space;
   (c) each of the calculated tensile forces is within a range from a minimum tensile force with which the wires are not loosened to a set maximum tensile force; and
   (d) a total value of the tensile forces is a lowest value in a range within which the conditions (a) to (c) are satisfied,
   wherein when each of the plurality of wires is pulled with a same tensile force, connection points of the plurality of wires with the haptic sensation producing member result in no movement of the haptic sensation producing member.

7. The information terminal according to claim 6,
   wherein when changing the object, the information processing unit detects a magnitude and a direction of a force generated on the object in a virtual space, and outputs data for specifying the detected magnitude and direction to the control unit, and
   the control unit calculates the tensile forces based on the data.

8. The information terminal according to claim 7,
   wherein the control unit calculates the tensile forces so as to satisfy conditions that:
   (a) a resultant force of the tensile forces coincides with a force generated on the object in a virtual space;
   (b) a moment generated on the haptic sensation producing member by the tensile forces coincides with a moment generated on the object in the virtual space;
   (c) each of the calculated tensile forces is within a range from a minimum tensile force with which the wires are not loosened to a set maximum tensile force; and
   (d) a total value of the tensile forces is a lowest value in a range within which the conditions (a) to (c) are satisfied.

9. The information terminal according to claim 6,
wherein the control unit detects a position of the haptic sensation producing member based on a distance from each wire tensile unit to a point where the wire corresponding thereto is connected to the haptic sensation producing member, and if the detected position is a position at which a limitation is placed on the haptic sensation due to a positional relationship between the wire tensile units, the control unit uses the tensile forces as set values and controls the wire tensile units based on the set values.

10. The information terminal according to claim 6,
wherein the control unit calculates the tensile forces such that a moment force generated on the haptic sensation producing member by the tensile forces is zero.

11. A haptic sensation producing method for presenting a haptic sensation to a user in accordance with a content displayed on a display panel, comprising:
a step (X) in which, in a device equipped with a panel-like haptic sensation producing member, a plurality of wires for holding the haptic sensation producing member, and wire tensile units that are provided for the respective wires and pull the corresponding wires, if a change occurs in an object included in the content as a result of the user touching the haptic sensation producing member, tensile forces for the respective wire tensile units are calculated such that the haptic sensation conforming to the change of the object can be generated by moving the haptic sensation producing member along a front face of the display panel, and such that the tensile forces for the wire tensile units are optimized; and
a step (Y) of controlling the wire tensile units based on the calculated tensile forces,
wherein a control unit calculates the tensile forces so as to satisfy conditions that:
(a) a resultant force of the tensile forces coincides with a force generated on the object in a virtual space;
(b) a moment generated on the haptic sensation producing member by the tensile forces coincides with a moment generated on the object in the virtual space;
(c) each of the calculated tensile forces is within a range from a minimum tensile force with which the wires are not loosened to a set maximum tensile force; and
(d) a total value of the tensile forces is a lowest value in a range within which the conditions (a) to (c) are satisfied,
wherein when each of the plurality of wires is pulled with a same tensile force, connection points of the plurality of wires with the haptic sensation producing member result in no movement of the haptic sensation producing member.

12. The haptic sensation producing method according to claim 11, wherein in the step (X), the tensile forces are calculated so as to satisfy conditions that:
(a) a resultant force of the tensile forces coincides with a force generated on the object in a virtual space;
(b) a moment generated on the haptic sensation producing member by the tensile forces coincides with a moment generated on the object in the virtual space;
(c) each of the calculated tensile forces is within a range from a minimum tensile force with which the wires are not loosened to a set maximum tensile force; and
(d) a total value of the tensile forces is a lowest value in a range within which the conditions (a) to (c) are satisfied.

13. The haptic sensation producing method according to claim 11 further comprising:
a step (Z) of detecting a position of the haptic sensation producing member based on a distance from each wire tensile unit to a point where the wire corresponding thereto is connected to the haptic sensation producing member, and if the detected position is a position at which a limitation is placed on the haptic sensation due to a positional relationship between the wire tensile units, using the tensile forces as set values and controlling the wire tensile units based on the set values.

14. The haptic sensation producing method according to claim 11,
wherein in the step (X), the tensile forces are calculated such that a moment force generated on the haptic sensation producing member by the tensile forces is zero.

15. A non-transitory computer-readable recording medium for a device that is equipped with a panel-like haptic sensation producing member, a plurality of wires for holding the haptic sensation producing member, wire tensile units that are provided for the respective wires and pull the corresponding wires, and a computer, and that presents a haptic sensation to a user in accordance with a content displayed on a display panel, the computer-readable recording medium storing a program containing a command for causing the computer to execute:
a step (X) in which if a change occurs in an object included in the content as a result of the user touching the haptic sensation producing member, tensile forces for the respective wire tensile units are calculated such that the haptic sensation conforming to the change of the object can be generated by moving the haptic sensation producing member along a front face of the display panel, and such that the tensile forces for the wire tensile units are optimized; and
a step (Y) of controlling the wire tensile units based on the calculated tensile forces,
wherein the control unit calculates the tensile forces so as to satisfy conditions that:
(a) a resultant force of the tensile forces coincides with a force generated on the object in a virtual space;
(b) a moment generated on the haptic sensation producing member by the tensile forces coincides with a moment generated on the object in the virtual space;
(c) each of the calculated tensile forces is within a range from a minimum tensile force with which the wires are not loosened to a set maximum tensile force; and
(d) a total value of the tensile forces is a lowest value in a range within which the conditions (a) to (c) are satisfied,
wherein when each of the plurality of wires is pulled with a same tensile force, connection points of the plurality of wires with the haptic sensation producing member result in no movement of the haptic sensation producing member.

16. The non-transitory computer-readable recording medium according to claim 15, wherein in the step (X), the tensile forces are calculated so as to satisfy conditions that:
(a) a resultant force of the tensile forces coincides with a force generated on the object in a virtual space;
(b) a moment generated on the haptic sensation producing member by the tensile force coincides with a moment generated on the object in the virtual space;
(c) each of the calculated tensile forces is within a range from a minimum tensile force with which the wires are not loosened to a set maximum tensile force; and
(d) a total value of the tensile forces is a lowest value in a range within which the conditions (a) to (c) are satisfied.

17. The non-transitory computer-readable recording medium according to claim 15, wherein the computer is further caused to execute:

a step (Z) of detecting a position of the haptic sensation producing member based on a distance from each wire tensile unit to a point where the wire corresponding thereto is connected to the haptic sensation producing member, and if the detected position is a position at which a limitation is placed on the haptic sensation due to a positional relationship between the wire tensile units, using the tensile forces as set values and controlling the wire tensile units based on the set values.

18. The non-transitory computer-readable recording medium according to claim 15,
wherein in the step (X), the tensile forces are calculated such that a moment force generated on the haptic sensation producing member by the tensile forces is zero.

* * * * *